United States Patent [19]
Uchidoi et al.

[11] Patent Number: 4,462,673
[45] Date of Patent: Jul. 31, 1984

[54] SHUTTER TIME CONTROL CIRCUIT

[75] Inventors: Masanori Uchidoi; Nobuyuki Suzuki, both of Kanagawa, Japan

[73] Assignee: Canon Kabushiki Kaisha, Tokyo, Japan

[21] Appl. No.: 401,701

[22] Filed: Jul. 26, 1982

[30] Foreign Application Priority Data

Aug. 3, 1981 [JP] Japan .............................. 56-121573
Jun. 10, 1982 [JP] Japan .................................. 57-99489

[51] Int. Cl.³ ............................................. G03B 7/093
[52] U.S. Cl. .................................................. 354/458
[58] Field of Search ............. 354/23 D, 50, 51, 60 A, 354/234, 235, 267, 458, 234.1, 235.1, 267.1; 307/591

[56] References Cited

U.S. PATENT DOCUMENTS 4,034,383 7/1977 Mashjmo et al. ................ 354/23 D
4,125,846 11/1978 Nakamoto et al. .............. 354/23 D

FOREIGN PATENT DOCUMENTS 54-27427 3/1979 Japan ................................... 354/458

Primary Examiner—William B. Perkey
Attorney, Agent, or Firm—Toren, Mcgeady and Stanger

[57] ABSTRACT

The disclosed shutter control circuit presents a shutter time as an analog value and converts the same into a digital value by an A/D converter, then nullifies information below a prescribed step of shutter time out of thus digitally converted value for effecting shutter time control based on a digital value which is above said prescribed step. In such a type of shutter time control circuit, even when an analog value as a preset value contains a certain error, the shutter time control can be done with said error being corrected and thus it is very convenient. In this case, however, an error in a positive direction only can be corrected, and an error in a negative direction can not be corrected. The present invention has been completed in view of the above and is to provide a shutter time control circuit which can correct the above mentioned analog value or A/D converted digital value by a prescribed amount so that errors in both the positive direction and the negative direction can be corrected in the above mentioned type of shutter time control circuit.

10 Claims, 9 Drawing Figures

FIG.2

| SHUTTER TIME | Tv | $\nabla$ | Q1 | Q2 | Q3 | Q4 | Q5 | Q6 |
|---|---|---|---|---|---|---|---|---|
| 1/1000 | 10 | 0 | 0 | 0 | 0 | 0 | 0 | 0 |
| 1/500 | 9 | $\frac{1}{10}\nabla r$ | 0 | 0 | 0 | 1 | 0 | 0 |
| 1/250 | 8 | $\frac{2}{10}\nabla r$ | 0 | 0 | 0 | 0 | 1 | 0 |
| 1/125 | 7 | $\frac{3}{10}\nabla r$ | 0 | 0 | 0 | 1 | 1 | 0 |
| 1/60 | 6 | $\frac{4}{10}\nabla r$ | 0 | 0 | 0 | 0 | 0 | 1 |
| 1/30 | 5 | $\frac{5}{10}\nabla r$ | 0 | 0 | 0 | 1 | 0 | 1 |
| 1/15 | 4 | $\frac{6}{10}\nabla r$ | 0 | 0 | 0 | 0 | 1 | 1 |
| 1/8 | 3 | $\frac{7}{10}\nabla r$ | 0 | 0 | 0 | 1 | 1 | 1 |

FIG.3

| MANUALLY SET SHUTTER TIME | ERROR STEP NUMBER | V | Q1 | Q2 | Q3 | Q4 | Q5 | Q6 | SHUTTER TIME TO WHICH THE SHUTTER IS CONTROLLED |
|---|---|---|---|---|---|---|---|---|---|
| 1/500 | $-\frac{8}{8}$ or 0 | $Vr-\frac{8}{10}\cdot\frac{8}{80}Vr$ | 0 | 0 | 0 | 0 | 0 | 0 | 1/1000 |
| " | $-\frac{7}{8}$ or $+\frac{1}{8}$ | " $-\frac{7}{80}Vr$ | 1 | 0 | 0 | 0 | 0 | 0 | " |
| " | $-\frac{6}{8}$ or $+\frac{2}{8}$ | " $-\frac{6}{80}Vr$ | 0 | 1 | 0 | 0 | 0 | 0 | " |
| " | $-\frac{5}{8}$ or $+\frac{3}{8}$ | " $-\frac{5}{80}Vr$ | 1 | 1 | 0 | 0 | 0 | 0 | " |
| " | $-\frac{4}{8}$ | " $-\frac{4}{80}Vr$ | 0 | 0 | 1 | 0 | 0 | 0 | " |
| " | $-\frac{3}{8}$ | " $-\frac{3}{80}Vr$ | 1 | 0 | 1 | 0 | 0 | 0 | " |
| " | $-\frac{2}{8}$ | " $-\frac{2}{80}Vr$ | 0 | 1 | 1 | 0 | 0 | 0 | " |
| " | $-\frac{1}{8}$ | " $-\frac{1}{80}Vr$ | 1 | 1 | 1 | 0 | 0 | 0 | " |
| " | 0 | " $\pm 0$ | 0 | 0 | 0 | 1 | 0 | 0 | 1/500 |
| " | $+\frac{1}{8}$ | " $+\frac{1}{80}Vr$ | 1 | 0 | 0 | 1 | 0 | 0 | " |
| " | $+\frac{2}{8}$ | " $+\frac{2}{80}Vr$ | 0 | 1 | 0 | 1 | 0 | 0 | " |
| " | $+\frac{3}{8}$ | " $+\frac{3}{80}Vr$ | 1 | 1 | 0 | 1 | 0 | 0 | " |
| " | $+\frac{4}{8}$ or $-\frac{4}{8}$ | " $+\frac{4}{80}Vr$ | 0 | 0 | 1 | 1 | 0 | 0 | " |
| " | $+\frac{5}{8}$ or $-\frac{3}{8}$ | " $+\frac{5}{80}Vr$ | 1 | 0 | 1 | 1 | 0 | 0 | " |
| " | $+\frac{6}{8}$ or $-\frac{2}{8}$ | " $+\frac{6}{80}Vr$ | 0 | 1 | 1 | 1 | 0 | 0 | " |
| " | $+\frac{7}{8}$ or $-\frac{1}{8}$ | " $+\frac{7}{80}Vr$ | 1 | 1 | 1 | 1 | 0 | 0 | " |
| " | $+\frac{8}{8}$ or 0 | " $+\frac{8}{80}Vr$ | 0 | 0 | 0 | 0 | 1 | 0 | 1/250 |

FIG.4

| MANUALLY SET SHUTTER TIME | ERROR STEP NUMBER | V | Q1 | Q2 | Q3 | Q4 | Q5 | Q6 | SHUTTER TIME TO WHICH THE SHUTTER IS CONTROLLED |
|---|---|---|---|---|---|---|---|---|---|
| 1/500 | $-\frac{8}{8}$ | $\frac{Vr}{10}+\frac{4}{80}Vr-\frac{8}{80}Vr$ | 0 | 0 | 1 | 0 | 0 | 0 | 1/1000 |
| " | $-\frac{7}{8}$ | " $-\frac{7}{80}Vr$ | 1 | 0 | 1 | 0 | 0 | 0 | " |
| " | $-\frac{6}{8}$ | " $-\frac{6}{80}Vr$ | 0 | 1 | 1 | 0 | 0 | 0 | " |
| " | $-\frac{5}{8}$ | " $-\frac{5}{80}Vr$ | 1 | 1 | 1 | 0 | 0 | 0 | " |
| " | $-\frac{4}{8}$ | " $-\frac{4}{80}Vr$ | 0 | 0 | 0 | 1 | 0 | 0 | 1/500 |
| " | $-\frac{3}{8}$ | " $-\frac{3}{80}Vr$ | 1 | 0 | 0 | 1 | 0 | 0 | " |
| " | $-\frac{2}{8}$ | " $-\frac{2}{80}Vr$ | 0 | 1 | 0 | 1 | 0 | 0 | " |
| " | $-\frac{1}{8}$ | " $-\frac{1}{80}Vr$ | 1 | 1 | 0 | 1 | 0 | 0 | " |
| " | 0 | " $\pm 0$ | 0 | 0 | 1 | 1 | 0 | 0 | " |
| " | $+\frac{1}{8}$ | " $+\frac{1}{80}Vr$ | 1 | 0 | 1 | 1 | 0 | 0 | " |
| " | $+\frac{2}{8}$ | " $+\frac{2}{80}Vr$ | 0 | 1 | 1 | 1 | 0 | 0 | " |
| " | $+\frac{3}{8}$ | " $+\frac{3}{80}Vr$ | 1 | 1 | 1 | 1 | 0 | 0 | " |
| " | $+\frac{4}{8}$ | " $+\frac{4}{80}Vr$ | 0 | 0 | 0 | 0 | 1 | 0 | 1/250 |
| " | $+\frac{5}{8}$ | " $+\frac{5}{80}Vr$ | 1 | 0 | 0 | 0 | 1 | 0 | " |
| " | $+\frac{6}{8}$ | " $+\frac{6}{80}Vr$ | 0 | 1 | 0 | 0 | 1 | 0 | " |
| " | $+\frac{7}{8}$ | " $+\frac{7}{80}Vr$ | 1 | 1 | 0 | 0 | 1 | 0 | " |
| " | $+\frac{8}{8}$ | " $+\frac{8}{80}Vr$ | 0 | 0 | 1 | 0 | 1 | 0 | " |

FIG.6

| PRESET SHUTTER TIME | | OP AMP. OUTPUT | | TFF 40 | TFF 41 | TFF 42 | TFF 46 | TFF 47 | TFF 48 | LATCHING OUTPUT Q4 | Q5 | Q6 |
|---|---|---|---|---|---|---|---|---|---|---|---|---|
| 1/500 | (1) | $E_o+E_I-\frac{4}{8}E_I$ | (a) | ○ | ○ | ○ | — | ○ | ○ | — | ○ | ○ |
| | | | (b) | ○ | ○ | — | ○ | ○ | ○ | | | |
| | (2) | $E_o+E_I-\frac{3}{8}E_I$ | (a) | — | ○ | ○ | — | ○ | ○ | — | ○ | ○ |
| | | | (b) | — | ○ | — | ○ | ○ | ○ | | | |
| | (3) | $E_o+E_I-\frac{2}{8}E_I$ | (a) | ○ | — | ○ | — | ○ | ○ | — | ○ | ○ |
| | | | (b) | ○ | — | — | ○ | ○ | ○ | | | |
| | (4) | $E_o+E_I-\frac{1}{8}E_I$ | (a) | — | — | ○ | — | ○ | ○ | — | ○ | ○ |
| | | | (b) | — | — | — | ○ | ○ | ○ | | | |
| | (5) | $E_o+E_I$ | (a) | ○ | ○ | — | — | ○ | ○ | — | ○ | ○ |
| | | | (b) | ○ | ○ | ○ | — | ○ | ○ | | | |
| | (6) | $E_o+E_I+\frac{1}{8}E_I$ | (a) | — | ○ | — | — | ○ | ○ | — | ○ | ○ |
| | | | (b) | — | ○ | ○ | — | ○ | ○ | | | |
| | (7) | $E_o+E_I+\frac{2}{8}E_I$ | (a) | ○ | — | — | — | ○ | ○ | — | ○ | ○ |
| | | | (b) | ○ | — | ○ | — | ○ | ○ | | | |
| | (8) | $E_o+E_I+\frac{3}{8}E_I$ | (a) | — | — | — | — | ○ | ○ | — | ○ | ○ |
| | | | (b) | — | — | ○ | — | ○ | ○ | | | |

SHUTTER TIME CONTROL CIRCUIT

BACKGROUND OF THE INVENTION

1. Field of the Invention

The present invention relates to an improvement of a digital shutter time control device for digitally controlling a shutter time of a camera which is manually set.

2. Description of the Prior Art

Heretofore, in a digital shutter time control device, such a system has been proposed in the Japanese Laid-Open patent application Sho No. 54-27427 that voltages obtained by operating an object brightness, a film sensitivity and a lens aperture value, etc. are converted to digital values of n bits (out of said n bits, lower level K bits are used for intermediate shutter times, and K+1 to n bits are used for so-called nominal (regular) shutter times with respective step), and one step is further divided into $\frac{1}{k}$ steps for providing an automatic exposure control, while at a time of a manual operation exposure information voltages being manually set are converted to digital values then lower level K bits out of said digital values are nullified, so that an accuracy in an actual manual shutter control will not be lowered even an accuracy in the exposure information voltage being manually set is lowered. However, as intermediate shutter times are simply discarded at a time of manual operation in said system, it has such shortcoming that only errors in the positive direction of voltage corresponding to a manually set shutter time is allowed but errors in the negative direction can not be allowed.

SUMMARY OF THE INVENTION

It is an object of the present invention to eliminate the above mentioned shortcoming of a conventional device and is to provide an exposure control device which can allow errors for positive and negative directions of voltage corresponding to a manually set shutter time.

Another object of the present invention is to provide a shutter time control circuit which has analog signals corresponding to a step number of prescribed shutter time being less than one step overlapped with analog signals of a shutter time forming circuit corresponding to a manually set shutter time, and A/D converts the same, then discards such digital values as corresponding to values below one step of shutter times out of said A/D converted digital values for effecting a shutter time control based on digital values above one step, so that an accurate preset shutter time control can be made even when analog signals of a shutter time forming circuit contains errors both in positive and negative directions.

Further, another object of the present invention is to provide a shutter time control device, which has such digital signals as corresponding to a prescribed step number of shutter time below one step overlapped with digital values obtained by A/D converting such analog signals as corresponding to a preset shutter time, and at the same time effects a shutter time control based on digital values being one step or higher out of said overlapped digital values, so that an accurate preset shutter time control can be made even when analog values corresponding to the preset shutter time contain errors both in positive and negative directions.

Still another object of the present invention is to provide a shutter time control device, which makes a prescribed amount of correction of digital values obtained by A/D converting such analog values as corresponding to preset shutter times, so that an accurate preset shutter time control can be made even when analog signals corresponding to preset shutter times contain errors both in positive and negative directions.

Further objects of the present invention shall be made clear by examples which will be explained by referring to drawings.

BRIEF DESCRIPTION OF THE DRAWINGS

FIG. 2 is a table to show count values of a counter when there are no errors.

FIG. 3 is a table to show count values of a counter in a conventional case.

FIG. 4 is a table to show count values of a counter in an example of the present invention.

FIG. 6 is a table to explain an operation of the circuit shown in FIG. 5.

DESCRIPTION OF THE PREFERRED EMBODIMENT

Figure 1:
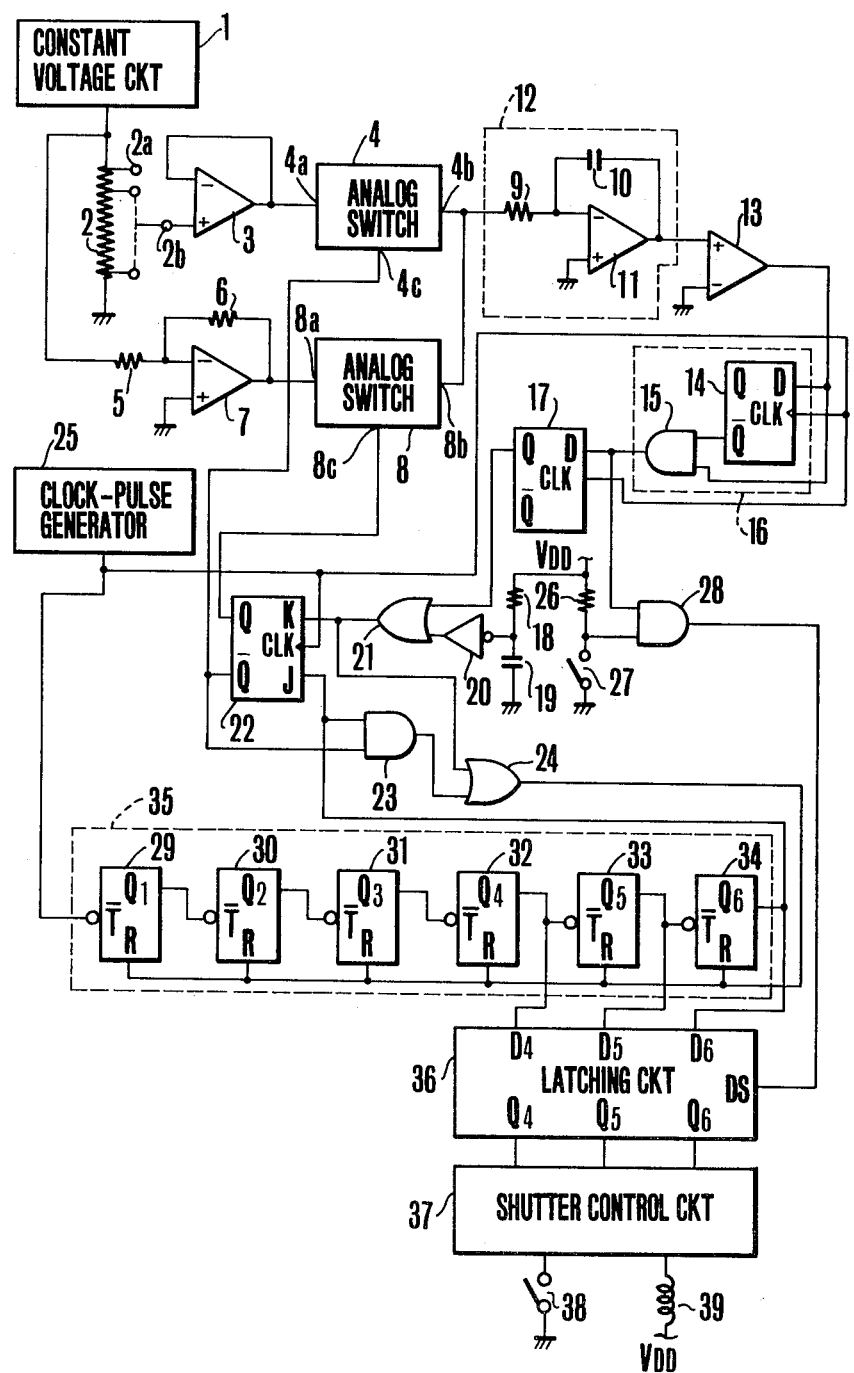
FIG. 1 is a circuit diagram to show an example of an exposure control device according to the present invention.

FIG. 1 is a circuit diagram to show an example of an exposure control device according to the present invention, wherein a constant voltage circuit 1 supplies a constant voltage Vr to a shutter time information resistor 2. The shutter time information resistor 2 has a plurality of tap electrodes 2a to which each step of shutter time, 1/1000, 1/500, 1/250,—is allotted from the bottom end thereof. A brush 2b slides over the tap electrodes 2a in an association with a shutter dial (not shown) and produces such voltage values as corresponding to a shutter time being manually set. To explain it in a concrete manner, if an apex value of a shutter time is represented by Tv, a voltage produced at the brush 2b shall be Vr (10−Tv)/10. An operation amplifier 3 with a follower connection works as a buffer and sends the voltage of the brush 2b to an analog switch 4. Resistors 5, 6 and an operation amplifier 7 inversely amplify the constant voltage Vr of the constant voltage circuit 1 and sends the same to an analog switch 8 as a reference voltage. The analog switches 4, 8 will have their terminals 4a and 4b or terminals 8a and 8b conducted therebetween when control terminals 4c, 8c reach a high level. A resistor 9, a capacitor 10 and an operation amplifier 11 constitutes an integration circuit 12. What is shown as 13 is a comparator.

A single pulse generating circuit 16 consists of a D-flip-flop 14 and an AND gate 15. What is shown as 17 is a D-flip-flop, 18 is a resistor, and 19 is a capacitor, wherein a power source voltage $V_{DD}$ is impressed to a series circuit of these components. What is shown as 20 is an inverter, 21 is an OR gate, 22 is a JK-flip-flop, 23 is an AND gate, 24 is an OR gate, 25 is a clock pulse generator, 26 is a resistor, 27 is a switch which becomes ON in an association with a mirror up, and 28 is an AND gate.

T-flip-flops 29 to 34 constitute a counter 35 and clock pulses from the clock pulse generator 25 are applied to input terminals T thereof. Each step of intermediate shutter times, that is 1/64,000, 1/32,000, 1/4,000, is allotted to the T-flip-flops 29 to 31, respectively, and each step of nominal shutter times, that is, 1/500, 1/250, 1/30 is allotted to the T-flip-flops 32 to 34, respectively. A latching circuit 36 latches data introduced into data input terminals D4 to D6 with a rise of a signal introduced to a data setting terminal DS, and sends out the same from output terminals Q4 to Q6. A shutter control circuit 37 counts a shutter time memorized in the latching circuit 36 when a switch 38 becomes OFF in an association with a running of a leading shutter screen, to magnetize a magnet 39 for controlling a follower shutter screen.

Next, explanations shall be made on operations. When a shutter release button (not shown in the drawing) is pressed to its first stroke, a power source switch becomes ON to supply a power source voltage to each part of the circuitry. The capacitor 19 is charged through the resistor 18 by the power source voltage $V_{DD}$. As said charging voltage reaches a prescribed value, an output of the inverter 20 inverts from a high level to a low level, and said low level will be maintained until the power source supply is cut off. Since a signal of initial high level from the inverter 20 is given to an input terminal K of the JK-flip-flop 22 through the OR gate 21, an output terminal $\bar{Q}$ thereof introduces a signal of high level to the control terminal 4C of the analog switch 4. Therefore, the analog switch 4 conducts and such analog voltage from the shutter time information resistor 2 as corresponding to a manually set shutter time is introduced into the integration circuit 12. And a signal of initial high level from the inverter 20 resets all of the T-flip-flops 29 to 34 through the OR gates 21, 24.

The circuits from the analog switch 4 to the counter 35 constitute an A/D conversion circuit of a double integration type. As an A/D conversion circuit of a double integration type has been known, for example a described in the Japanese Laid-Open patent application Sho No. 51-27427.

While the output terminal $\bar{Q}$ of the JK-flip-flop 22 becomes to have a high level by an initial resetting and is applied to one of input terminals of the AND gate 23, as the other input terminal of the AND gate 23 is connected to the output terminal Q6 of the T-flip-flop 34 having an initial resetting done thereon, an output of the AND gate 23 becomes to have a low level, and an output of the OR gate 24 also will have a low level, thus a resetting of the T-flip-flops 29 to 34 is released for starting a counting of clock pulses.

The integration circuits 12 integrates an anolog voltage which has passed through the analog switch 4 for a predetermined length of time until an output of the output terminal Q6 of the T-flip-flop 34 is inverted to a high level. That is, the capacitor 10 will be charged. As the output of the output terminal Q6 of the T-flip-flop 34 is inverted to a high level, the JK-flip-flop 22 is reset thereby, and a high level signal is sent from the output terminal Q to the analog switch 8 to secure a conductance. Therefore, a reference voltage produced by the operation amplifier 7 is applied to the integration circuit 12, then the integration cirouit 12 makes an integration in the direction of inverse polarity. That is the capacitor 10 is discharged. Also, as an output of the AND gate 23 will have a high level momentarily by an output change of the T-flip-flop 34 from the high level to the low level, the T-flip-flops 29 to 34 are all reset again. From the moment of said re-resetting, the T-flip-flops 29 to 34 continue counting clock pulses until the discharging of the capacitor 10 is completed, that is until an output of the comparator 13 is inverted to a high level. When the output of the comparator 13 becomes to have a high level, the single pulse generator circuit 16 sends a single pulse to the data setting terminal DS of the latching circuit 36 through the AND gate 28, and the latching circuit 36 memorizes temporarily the data at that time and sends out the same from output terminals Q4 to Q6. This completes one cycle of the AD conversion function.

Now, explanations shall be made on a relationship among an apex value Tv of a shutter time, an analog voltage V of the shutter time information resistor 2 (or an analog voltage of the operation amplifier 3), and a count value of the counter 35. When the constant voltage of the constant voltage circuit 1 is expressed by Vr, and a setting of $$V = Vr(10 - Tv)/10$$

is made, and the number of pulses counted for each step of shutter time is 8, count values as shown in FIG. 2 will be obtained. That is, if the analog voltage V from the shutter time information resistor 2 is accurate, an accurate value can be obtained as a digital value corresponding to a shutter time. But, it is generally difficult to manufacture such a resistor and a cost therefor will go up along with an accuracy to be secured thereby. FIG. 3 shows count values of the counter 35 in a case there are errors in the analog voltage V for a shutter time of 1/500. FIG. 3 shows a case when errors in the analog voltage V are from $-8Vr/80$ to $T8Vr/80$, that is a case when a number of steps of error is $-8/8$ to $+8/8$. Vr/80 therein corresponds to 1 count of the T-flip-flop 29. As being apparent from FIG. 3, even when a manually set shutter time is 1/500 and errors of 0 to $+7/8$ steps exist in the shutter time information resistor 2, lower 3 bits (Q1 to Q3) of the counter 35 is discarded, therefore even if a control is made with 1/500, if there is an error of even ⅛ step in the minus side, a control will be made with 1/1000.

Now, in this example voltages setting at the tap electrode 2a of the shutter time information resistor 2 are increased by $+4/8$ steps respectively to make the analog voltage V as shown by the following equation:

$$V = Vr(10 - Tv)/10 + 4 \, Vr/80$$

Count values of the counter 35 at this time are shown in FIG. 4. According to FIG. 4, even if there are errors of $-4/8$ to $+⅜$ steps, a control can be done precisely with 1/500. That is, regardless the position of the error of the shutter time information resistor 2 in a plus side or a minus side, an accurate digital value for a shutter control is sent out from the output terminals Q4 to Q6 of the latching circuit 36.

A single pulse produced out of the single pulse generator circuit 16 at a time one cycle of AD conversion function is completed resets the JK-flip-flop 22 through the OR gate 21, after being delayed as much as one clock pulse by the D-flip-flop 17, and at the same time resets the T-flip-flops 29 to 34 also, through the OR gate 24. By this, a next AD conversion function starts again.

As the shutter release button is pressed to its second stroke, a mirror jumps up and the switch 27 becomes ON, prohibiting a latching of the latching circuit 36 thereafter. And when a leading shutter screen runs following the mirror up, the switch 38 becomes OFF and the shutter control circuit 37 counts a shutter time based on the temporily memorized value of the latching circuit 36 to megnetize the follower shutter screen control magnet 39. By this the follower shutter screen runs, thus completing an exposure.

As a voltage equivalent to 0.5 step is overlapped within the shutter time information resistor 2 in this example, flip-flops and operation amplifiers will not be needed compared to a circuit in which an overlapping is made at the counter 25 and at a latter step of the operation amplifier 3, thus a circuitry will be simplified and cost thereof will be lowered, and power consumption can be reduced.

In FIG. 1, the shutter time information resistor 2 and the operation amplifier 3 correspond to a shutter time forming circuit of the present invention, and the circuits from the analog switch 4 to the counter 35 correspond to a conversion circuit of the present invention.

While a voltage corresponding to 0.5 step is overlapped within the shutter time information resistor 2 in the example shown in the drawing, the overlapping will not necessarily limited to 0.5 step, instead a satisfactory effect can be attained as long as it is less than one step.

The latching circuit 36 is not necessarily indispensable, and the latching circuit 36 may be omitted when the counter 35 makes a temporary memorizing, etc.

Figure 5:
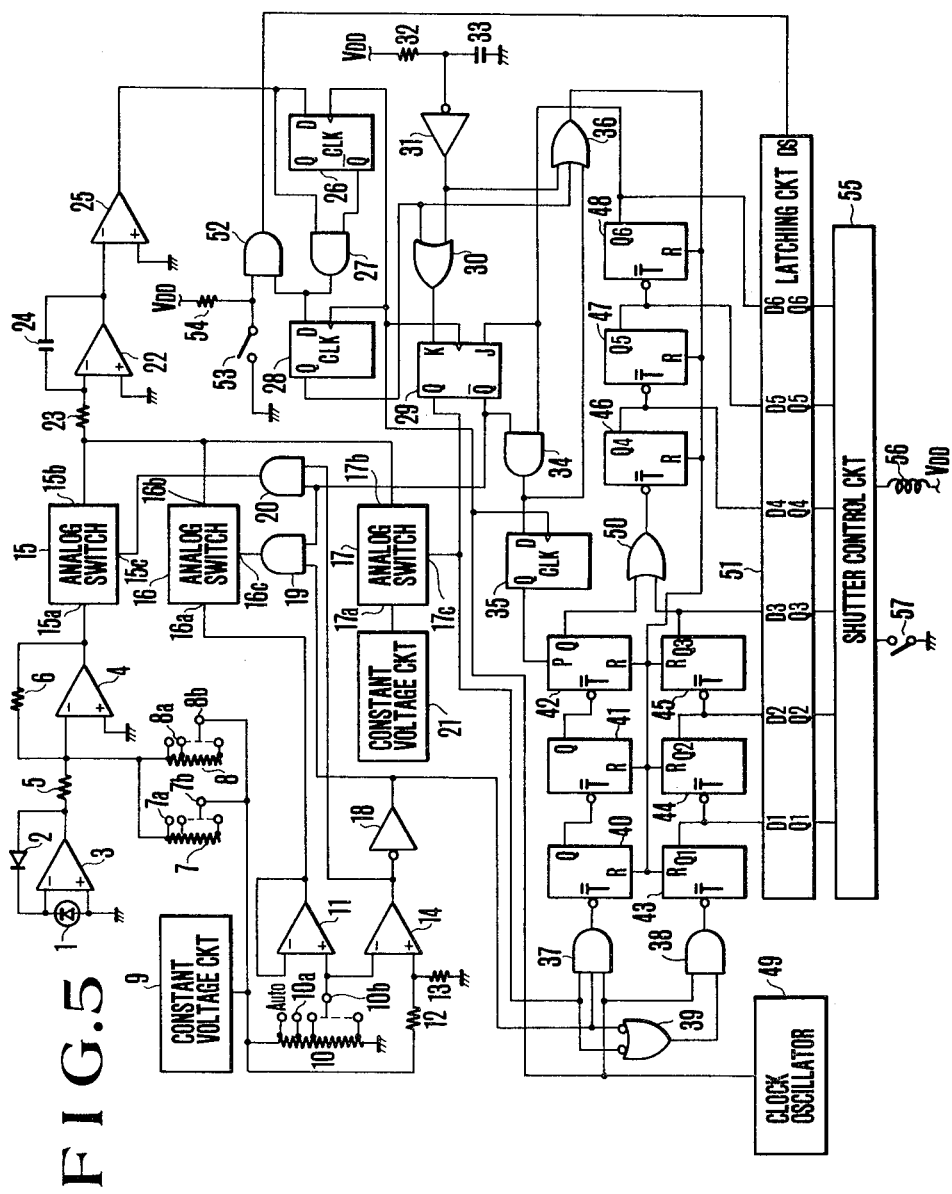
FIG. 5 is a circuit diagram to show another example of an exposure control device according to the present invention.

FIG. 5 is a circuit diagram to show another example of an exposure control device according to the present invention, wherein 1 is a light receiving element to produce such current as corresponding to an object brightness, and 2 is a logarithmic compression diode to logarithmically compress the current of the light receiving element 1, while what is shown as 3 is an operation amplifier (hereinafter called as OP Amp) and produces together with the light receiving element 1 and the diode 2 such voltage as corresponding to the object brightness.

What is shown as 4 is an OP Amp, and 5, 6 are resistors, while 7 is a film sensitivity information resistor, in which 7a are its tap electrodes, and 7b is a brush sliding over the tap electrodes 7a, wherein a position on the tap electrodes to which the brush 7b contacts is varied in an association with an ASA dial not being shown to vary a resistance value of the resistor 7 according to the set film sensitivity. What is shown as 8 is an aperture information resistor and has a similar structure as that of the film sensitivity information resistor 7, wherein 8a are its tap electrodes and 8b is a brush. Also the aperture information resistor 8 varies a resistance value between a connection point of the resistors 5, 6 and the brush 8 corresponding to a number of steps stopped down from a full open position of a lens (the minimum F-number) in an association with a lens aperture diaphragm ring not being shown. What is shown as 9 is a constant voltage circuit to supply a minus constant voltage to the film sensitivity information resistor 7, the aperture information resistor 8, a shutter time information resistor 10 to be described later, and a resistor 13 also to be described later. What is shown as 10 is a shutter time information resistor and 10a are tap electrodes thereof, being set for each step of shutter time (1/1000, 1/500, 1/250, -----). What is shown as 10b is a brush sliding over the tap electrodes 10a. And such voltage value as corresponding to a shutter time value which has been set in an association with a shutter dial not being shown is produced at the brush 10b. When the shutter dial is set at a position of Auto, the voltage at the brush 10b will have a same level as that of the voltage of the constant voltage circuit 9. What is shown as 11 is an OP Amp with a follower connection, at which the voltage of the brush 10b of the shutter time information resistor 10 will be produced as it is. What are shown as 12, 13 are resistors and a bleeder voltage of the constant voltage circuit 9 will appear at a connection point between the resistors 12 and 13, and said voltage is impressed to a plus input terminal of the comparator 14 to be described below. What is shown as 14 is a comparator and the voltage of the brush 10b of the shutter time information resistor 10 is impressed to a minus input terminal of said comparator 14, thus a comparison thereof with the voltage at the plus terminal will be made. The bleeder voltage ratio of the resistors 12, 13 is so set that the plus input terminal of the comparator 14 will have greater voltage than the voltage at the minus input terminal only when the shutter dial not being shown is set at a position of Auto, and an output of the comparator 14 will have a high level (hereinafter called as H) only when the shutter dial is set at the position of Auto, while the output of the comparator will have a low level (hereinafter called as L) when the shutter dial is set a position below the Auto, that is a position of manual. What are shown as 15, 16, 17 are analog switches being made of FET, etc., in which a conductance between each terminal a and b is secured when each of terminals c becomes to have H. What is shown as 18 is an inverter to invert an output level of the comparator 14. What are shown as 19, 20 are AND gates, and 21 is a constant voltage circuit used as a reference voltage for an A/D converter which is to be described later. What is shown as 22 is an OP Amp, 23 is a resistor, and 24 is a capacitor, wherein these three components constitute an integrator. What is shown as 25 is a comparator, and 26, 28, 35 are D-type flip-flops, in which inputs are impressed to their D terminals and clock pulses are impressed to their CLK terminals, while outputs are sent out from their Q terminals, and inverted output of the Q output will come out from the $\overline{Q}$ terminal. What is shown as 27 is an AND gate and 29 is a JK-flip-flop, in which a K terminal is a reset terminal thereof and a J terminal is a set terminal and input is impressed to each of said terminals and output appears from a Q terminal and an inverted output of the Q output appears from a $\overline{Q}$ terminal in synchronism with the clock pulses. What is shown as 30 is an OR gate and 31 is an inverter, while 32 is a resistor and a power source voltage $V_{DD}$ is impressed to one terminal in each one of them. What is shown as 33 is a capacitor, 34 is an AND gate, 36 is an OR gate with 3 inputs, and 37, 38 are AND gates, while 39 is a NAND gate. What are shown as 40 to 48 are T-flip-flops constituting a counter, in which input pulses are impressed to their $\overline{T}$ terminals and outputs appear at their Q terminals. The T-flip-flops 40 to 45 count intermediate shutter times, while the T-flip-flops 46 to 48 count shutter times for each one step. In the T-flip-flops, R terminals are reset terminals and P terminals are preset terminals. Here P terminal is employed only in the T-flip-flop 42. What is shown as 49 is a clock oscillator to supply clock pulses to the D-flip-flops 26, 28, 35 and the AND gates 37, 38. What is shown as 50 is an OR gate and 51 is a latching circuit to latch data introduced to the $D_n$ (wherein n=1 to 6) terminals at a rise of a signal introduced to a DS (data set) terminal thereof and send the same out from terminals $Q_n$. What is shown as 52 is an AND gate and 53 is a switch which becomes ON in an association with an ascending of a mirror not being shown. What is shown as 54 is a resistor and one terminal thereof is connected to the power source voltage $V_{DD}$. What is shown as 55 is a shutter control circuit to control a magnet to be described later based on an output of the latching circuit 51, for controlling a shutter not being shown. What is shown as 56 is a magnet to retain a follower shutter screen not being shown. What is shown as 57 is a switch which is made OFF in an association with a start of a running of a leading shutter screen not being shown, and the shutter control circuit starts counting a duration of time for retaining the follower screen from a moment of said switch becoming OFF Next, operations of an exposure control device according to the present invention shown in FIG. 5 shall be explained. First, explanations shall be made on a case of an automatic photographing. In this case a shutter dial is rotated to select a position of Auto. By this the brush 10b is connected to the terminal auto. When the shutter button not being shown is pressed to a first stroke a power source switch not being shown is put in and power source is supplied to each part of the circuit. Now, as the brush 10b is connected to the contact auto, a voltage of the brush 10b of the shutter time information resistor 10 becomes same as the voltage of the constant voltage circuit 9 and the voltage thereof is impressed to the minus input terminal of the comparator 14 and is compared with the voltage at the plus input terminal (bleeder voltage by the resistors 12, 13 of the voltage of the constant voltage circuit 9), then as the voltage at the plus input terminal is higher than output of the comparator 14 produces H. Also as a power source is put in by the first stroke pressing of the shutter button a voltage at a connection point of the resistor 32 and the capacitor 33 goes up from zero. By this, an output of the inverter 31 changes from H to L, and maintains L until the power source supply is cut off. As the H at its initial stage is added to the terminal K of the JK-flip-flop 29 through the OR gate 30, the terminal $\overline{Q}$ thereof becomes H and said H is impressed to one of input terminals of the AND gate 20. Since H is introduced from the comparator 14 to the other input terminal of said AND gate 20, the output of the AND gate 20 also becomes H and the terminal 15c of the analog switch 15 becomes H, therefore a conductance is secured between 15a and 15b of the analog switch 15 and such analog voltage as corresponding to shutter information of Auto is introduced into the A/D converter. Also an initial H of the inverter 31 makes an initial resetting of the T-flip-flop group 40 to 48 through the OR gate 36. Since an A/D converter of a double integration type has been known for example by the Japanese patent Laid-Open No. Sho 54-27427 as mentioned above, detailed explanation thereof shall be omitted, but the capacitor 24 is charged for a prescribed period of time with current flowing through the resistor 23 by the output voltage of the OP Amp 4 corresponding to a shutter time of Auto, then the capacitor 24 is discharged, and a digital value corresponding to an input voltage is obtained by counting pulses during a period of said discharging. That is, since the Q terminal of the JK-flip-flop 29 becomes L by the initial reset, the NAND gate 39 becomes H level, and the capacitor 24 will be charged until a moment when the counting is made consecutively by the T-flip-flops 43 to 48 which constitute a clock pulse counter for the clock pulses coming from the clock oscillator through the AND gate 38 and the terminal Q6 of the T-flip-flop 48 changes from L to H (that is for a prescribed length of time). When the terminal Q6 of the T-flip-flop 48 becomes H, the JK-flip-flop 29 is set and the Q terminal becomes H and the $\overline{Q}$ terminal becomes L, and a conductance is secured between 17a and 17b of the analog switch 17 in place of the analog switch 15. By this, the reference voltage of the constant voltage circuit 21 (having an inverse polarity against that of the output voltage of the OP Amp 4) is applied to the resistor 23 and a discharging of the capacitor 24 is started. Also, since the AND gate 34 becomes H momentarily by a change of the Q6 of the T-flip-flop 48 from L to H, said H is transmitted to the reset terminals R of the T-flip-flops 40 to 48 through the OR gate 36, and the T-flip-flops 40 to 48 are re-reset. Since the comparator 14 produces H and the inverter 18 is H in the case of Auto as mentioned above, the NAND gate 39 is H and the clock pulses continue to be sent out through the AND gate 38, and the counting is continued at the T-flip-flops 43 to 48 until the discharging of the capacitor 24 is finished that is until the output of the comparator 25 changes from L to H. Here, the T-flip-flops 46 to 48 count nominal shutter times for each step, while the flip-flops 43 to 45 count shutter times of what has divided one step by 8 that is shutter times of every ⅛ step. When the output of the comparator 25 changes from L to H, H will be produced momentarily from one shot circuit consisting of the D-flip-flop 26 and the AND gate 27 and is impressed to the data set terminal DS of the latching circuit 51 through the AND gate 52. And the latching circuit 51 continues to hold the data of D1 to D6 at that time and send out the same from the Q1 to Q6, thus one cycle of the A/D conversion operation is completed and a shutter time value computed at the latching circuit is memorized. Here the shutter control circuit is so set that a shutter time of 1/1000 second is obtained at a time the outputs Q4 to Q6 of the nominal shutter time step becomes $$\begin{pmatrix} Q4 & Q5 & Q6 \\ 0 & 0 & 0 \end{pmatrix},$$

and 1/500 second is obtained by $$\begin{pmatrix} Q4 & Q5 & Q6 \\ 1 & 0 & 0 \end{pmatrix},$$

while 1/125 second is obtained by $$\begin{pmatrix} Q4 & Q5 & Q6 \\ 0 & 1 & 0 \end{pmatrix}.$$

And one shot pulse from the one shot circuit consisting of the D-flip-flop 26 and the AND gate 27 is transmitted to the reset terminals of the T-flip-flops 40 to 48 through the OR gate 36 after being delayed by one clock at the D-flip-flop 28, thus said T-flip-flops are reset again. Also, said one shot pulse being delayed by one clock is transmitted to the terminal K of the JK-flip-flop 29 through the OR gate 30, and a reset the terminal Q thereof becomes L and a series of the A/D conversion operation mentioned above will be done again.

Now, when the shutter button is pressed to its second stroke, the mirror not being shown in the drawing jumps up to close the switch 53, prohibiting the data setting of the latching circuit 51 after that. Also, when the leading screen not being shown runs following the mirror up, the switch 57 becomes OFF and shutter control circuit 55 counts a shutter time based on the memorized value of the latching circuit 51 to control the follower screen control magnet 56 for making the follower screen to run, thus completing an exposure.

Next, explanations shall be made on a case of a manual setting of a shutter dial. In this case, the shutter dial is moved from the position of Auto and a desired shutter time is selected. By this the brush 10b is connected to a terminal corresponding to the set shutter time (a shutter time with one step gradient), after releasing the connection with the terminal Auto, when the first stroke pressing of the shutter button is done after that, power supply to each circuit will be made. Since the brush 10b has its connection with the terminal Auto released as mentioned above, the minus terminal of the comparator 14 will have higher voltage than the input voltage at the plus terminal, therefore the comparator 14 produces L and the inverter produces H. On the other hand, since the JK-flip-flop 29 has its $\bar{Q}$ output at H by the first stroke as mentioned above, the AND gate 19 produces H. Therefore, a conductance is secured between the 16a and 16b of the analog switch 16 and a voltage corresponding to a manual shutter time from the OP Amp 11 (corresponding to shutter time with each step) is applied to the A/D converter. Therefore, the capacitor 24 will be charged by such current as corresponding to said voltage as mentioned above. On the other hand, the T-flip-flops 43 to 48 count the pulses from the clock pulse oscillator 49 being introduced thereinto through the AND gate 38 as mentioned above, and the JK-flip-flop 29 is set at a time when H is produced out of the output Q6 of the T-flip-flop 48 by said counting, and the switch 17 conducts in place of the analog switch 16 as mentioned above, then the output of the constant voltage circuit 21 is applied to the A/D converter to stop the charging of the capacitor for starting a discharging. On the other hand, at this time H (one clock pulse) is produced from the AND gate 34 momentarily as mentioned above, and the flip-flops 40 to 48 are reset, and at the same time one clock pulse from the gate 34 is delayed by one clock at the D-flip-flop 35 and is transmitted to the terminal P (preset terminal) of the T-flip-flop 42, then said flip-flop 42 is preset. As said flip-flop is to count ½ step of shutter time, the counting action is to be started from a state as having ½ step additionally counted as the discharging is made at the capacitor 24 in a case of a manual setting.

Also, since the inverter 18 produces H as mentioned above in the case of manual setting, the NAND gate 39 is closed and the AND gate 38 is also closed when H is produced from the output Q of the JK-flip-flop 29, as mentioned above. On the other hand, the AND gate 37 is opened in response to the Q output (H) of the flip-flop 29, and the pulses from the clock oscillator 49 is transmitted to the T-flip-flops 40 to 42 and 46 to 48 through said gate 37. Thus, the counter as the capacitor 24 is discharged at a time of manual setting will be made up with the T-flip-flops 40 to 42 and 46 to 48.

After this, a counting of pulses by said counter (40 to 42, and 46 to 48) is done until the output of the comparator 25 is inverted from L to H by the discharging of the capacitor 24 in a manner similar to the above-mentioned case of Auto, and as the output of the comparator 25 changes from L to H, pulses are impressed momentarily to the data set terminal DS as mentioned above, then the counted value by the counter at this time is memorized in the latching circuit 51 (here in a case of manual setting, information of the flip-flops 46 to 48, that is information on one step and above only is memorized). Then said operation will be repeatedly carried out until the second stroke pressing is done, and as the second stroke pressing is made a control of shutter time will be carried out based on a memorized value being memorized at the latching circuit 51.

Since the T-flip-flops 40 to 42 are used as a counter for information below one step of shutter time in place of the T-flip-flops 43 to 45 in the case of manual setting as mentioned above and since H is preset at the flip-flop 42 beforehand, such digital value as corresponding to a value with an addition of ½ step over the preset value is obtained as the A/D conversion value similarly as in the case when the value with an addition of ½ step over the preset value is A/D converted in the example of FIG. 1, thus, a shutter time control exactly according to a preset shutter time information will be carried out even if there are errors of $-4/8$ to $+\frac{3}{8}$ steps in the resistance values of the shutter time information resistance 10.

That is, a counter to count the A/D conversion output at a time of manual setting is made of the T-flip-flops 40 to 42 and 46 to 48 as mentioned above, and the output of the flip-flops 40 to 42 will not be applied to the latching circuit out of said flip-flops, therefore, even if the A/D conversion output of manually set shutter time is not corresponding to the preset shutter time, as long as the information of one step and above that is the count value of the T-flip-flops 46 to 48 only is accurate, digital values exactly as the preset shutter time will be latched at the latching circuit, thus accurate shutter time control will be carried out.

For example, if a preset shutter time is 1/500 second and the output of the OP Amp 11 precisely corresponding to 1/500 second is expressed by E0+E1, the A/D conversion value of E0+E1 is to become $$\begin{pmatrix} 40, & 41, & 42, & 46, & 47, & 48 \\ 0, & 0, & 0, & 1, & 0, & 0 \end{pmatrix}$$

as shown in (b) of (5) in FIG. 6, but as "H" is preset at the flip-flop 42, the value will become as shown by (a) of (5) in FIG. 6. Therefore, even if the output of the OP Amp 11 varies within the range of E0+E1 to $-4/8$E1, or $+\frac{3}{8}$E1, the A/D conversion value will be as shown by (a) of FIG. 6(1) to (8), and the output of the latching circuit 51 will become as $$\begin{pmatrix} Q1, & Q2, & Q3, & Q4, & Q5, & Q6 \\ 0, & 0, & 0, & 1, & 0, & 0 \end{pmatrix}.$$

Therefore, when the voltage corresponding to the preset shutter time is within a range of $-4/8$E1 to $+\frac{3}{8}$E1, an accurate shutter time control according to a preset shutter time will be carried out, which allows a shutter time setting resistor to have a less precise resistance value. Also, as mentioned above, as "1" is preset at the flip-flop 42 which counts the information of ½ step in the case of manual setting in this example, even if such voltage as corresponding to a preset shutter time deviates from an appropriate value (for example E0+E1 in the case of 1/500 second) to the positive or negative direction as mentioned above, a shutter time control according to a set value will be carried out.

Figure 7:
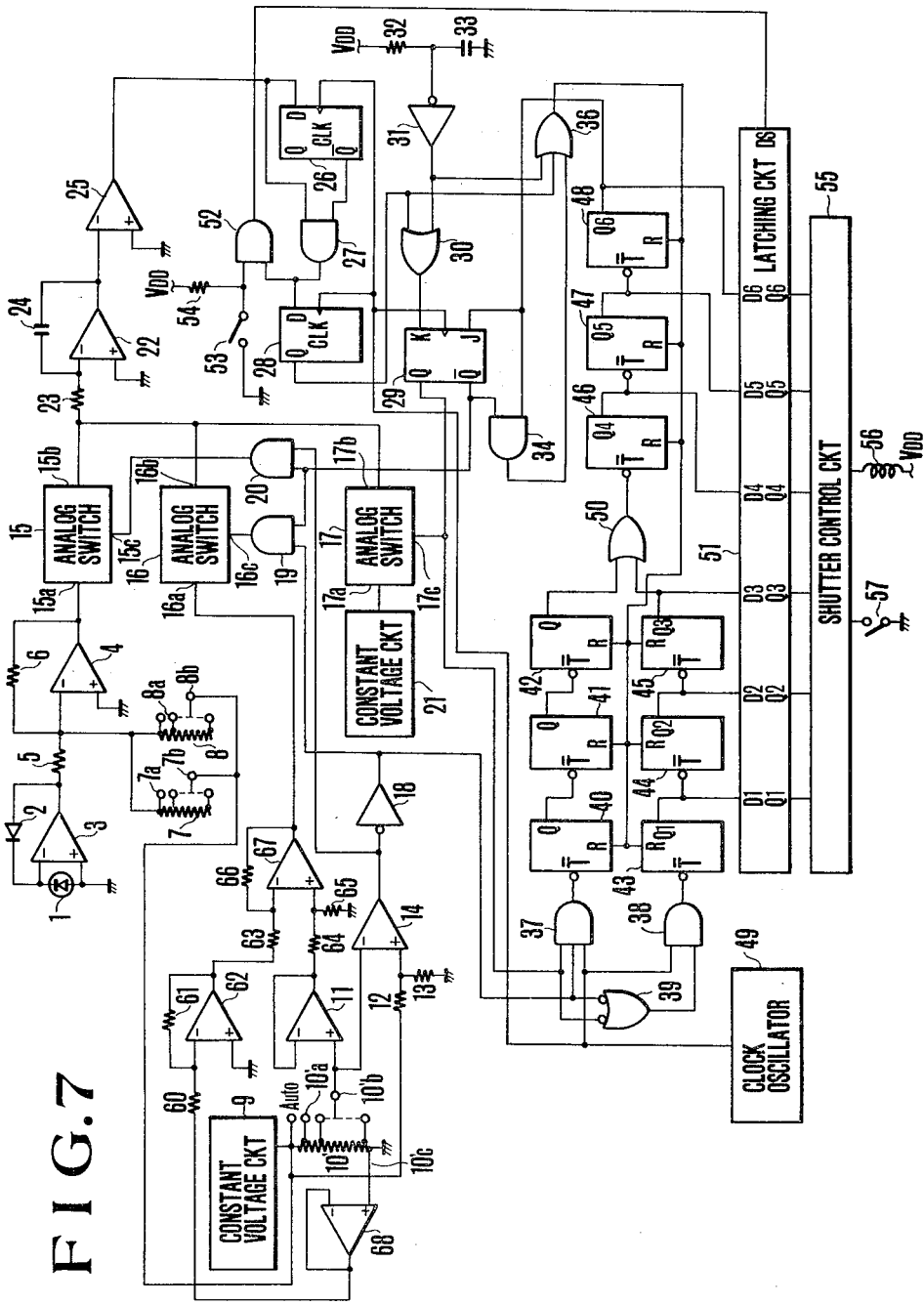
FIG. 7 is a circuit diagram to show still another example of the present invention.

FIG. 7 is a circuit diagram to show another example of an exposure control device according to the present invention, wherein elements having same circuit arrangement and function as those of the example shown in FIG. 5 are represented by same marks and numbers. Said circuit is different from the example in FIG. 5 in that a voltage corresponding to ½ step of a shutter time value is added to a voltage corresponding to a shutter time value set by the shutter time setting resistor 10' at a time of manual setting and is applied to the A/D converter. In this drawing, 68 is an OP Amp constituting a buffer amplifier, and a non-inverting input terminal of said amplifier is connected to a tap electrode 10'c of the shutter time setting resistor 10'. A voltage corresponding to ½ step of a shutter time is produced from said electrode. What is shown as 62 is an OP Amp, and 60, 61 are resistors, wherein an output of said OP Amp 68 is impressed to a non-inverting input terminal of said OP Amp 62 and a plus-minus state of the output voltage of the OP Amp is inverted by said OP Amp 62 and the output of the OP Amp 68 is transmitted to a non-inverting input terminal of the OP Amp 67 through the resistor 63. The output of the OP Amp 11 is impressed to the non-inverting input terminal of the OP Amp 67, and ½ step information is added to a preset shutter time information by said OP Amp 67, then said shutter time information with said addition is introduced into the analog switch 16.

Explanations shall be made on operation of the example shown in FIG. 7 having the above-mentioned arrangements.

Since exactly same operations will be made in the case of Auto as those in the example of FIG. 5, explanations thereof shall be omitted.

Figure 8:
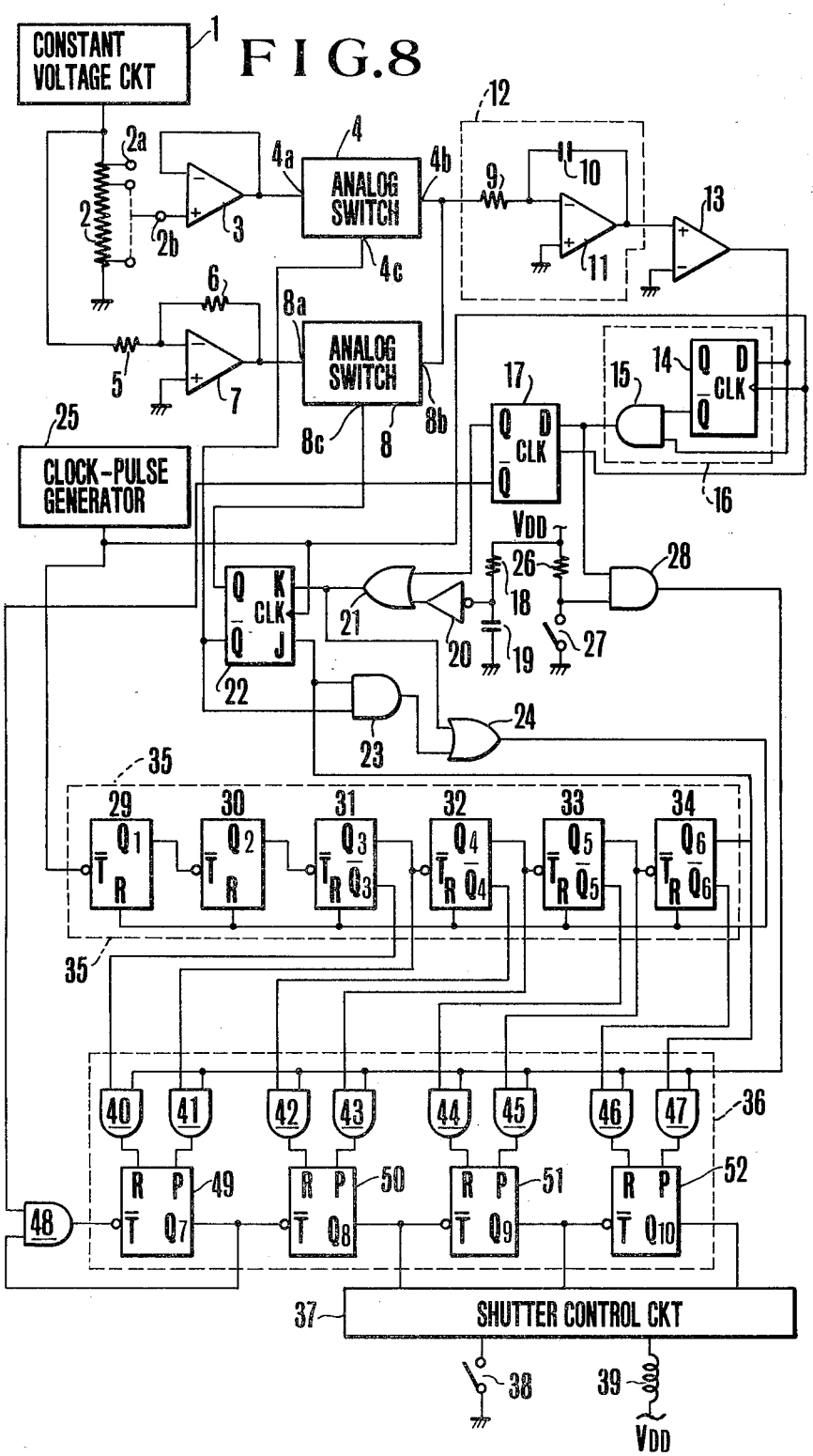
FIG. 8 is a circuit diagram to show further another example of the present invention.

Explanations shall be made in a case of a manual setting. In this case, a desired shutter time is selected by a shutter dial not being shown. By this the brush 10' is connected to a prescribed terminal corresponding to a shutter time set by the contact terminal 10'a, and a voltage corresponding to a preset shutter time is produced from the OP Amp 11. On the other hand, since such voltage as corresponding to ½ step of shutter time is produced from the OP Amp 68, an addition of ½ step is made over a preset shutter time by the OP Amp 67 and a voltage corresponding to the shutter time with said ½ step addition is produced and is applied to the analog switch 16. By this the shutter time information being introduced into the switch 16 is A/D converted as in the example shown in FIG. 5, and the preset shutter time information is formed as a digital value at a counter consisting of the T-flip-flops 40 to 42 and 46 to 48. At this time since the output of the OP Amp 67 has ½ step added over the preset shutter time as mentioned above, ½ step information will be A/D converted in addition to the preset value. Therefore, at the same time the preset shutter time will be set at the counter, the T-flip-flop 42 will be set to "1", thus errors with a range of −4/8 to +⅜ steps may be allowed in a resistance value of a shutter time resistor as in the case of the example shown in FIG. 5. FIG. 8 is a circuit diagram to show another example of the present invention, wherein same circuit component parts as in the example shown in FIG. 1 will have same marks and numbers. The circuit shown in FIG. 8 is different from the example shown in FIG. 1 in that a voltage to be set at the tap electrode 2a of the resistor 2 is so set as corresponding to one step of a shutter time without adding +4/8 steps each, further the latching circuit 36 is constituted by the T-flip-flops 49 to 52 and the AND gates 40 to 47, and what is contained in the flip-flops 31 to 34 of the counter 35 is transferred to the latching circuit by the AND gates 40 to 47, thereby having the latching circuit memorize information including ½ step, being one bit below the one step of shutter time, so that when a value of the flip-flop 31 is at a high level that is when a value corresponding to ½ step of shutter time after A/D conversion is at high level, a shift pulse is introduced through the AND gate 48 and a value of the latching circuit is counted up by one pulse.

Next operations of the example shown in FIG. 8 shall be explained. Since the operation from a time the analog voltage from the tap electrode 2a selected by the brush 2b is A/D converted till a time such digital value as corresponding to the preset shutter time is formed at the counter 35 are same as in the example shown in FIG. 1, explanation therefor shall be omitted.

When the A/D conversion is completed, a single pulse is transmitted from the AND gate 28 to the gates 40 to 47, and a value of the flip-flops 31 to 34 constituting the counter 35 is transferred to the flip-flops 49 to 52 of the latching circuit. The voltage set at the tap electrodes of the resistor 2 corresponds to each one step of shutter time as explained above and ½ step addition is not made being different from the example shown in FIG. 1, therefore the outputs Q4 to Q6 of the flip-flops 32 to 34 of the counter at a time the A/D conversion is completed show such digital values as corresponding to the set shutter time only when the output voltage of the tap 2a has errors in the positive direction against the set shutter time as shown in FIG. 3, and show such digital values as corresponding to shutter time being one step each deviated (delayed) from the set shutter time when errors in the negative direction are contained. Also at this time the output Q3 of the flip-flop 31 shows a high level when a voltage corresponding to a set shutter time contains errors within a range of −⅛ step to −4/8 step in the negative direction against the step number of the set shutter time as shown in FIG. 3, and shows a low level when errors within a range of +⅛ step to +⅜ step are contained in the positive direction. Thus, in the present example, when the output of the flip-flop 31 that is information expressing ½ step of shutter time is at high level such digital value as representing one step or above of shutter time is counted up and one step shifting is made thereby making a shutter time control accurately according to a preset shutter time even if number of steps in error is within a range of −⅛ to +⅜ steps. For example, if the step number in errors is within a range from +⅛ step to ⅜ steps, the Q3 output of the flip-flop 31 will become "0" as shown by FIG. 3. Therefore, in this case the Q7 of the flip-flop 47 of the latching circuit also becomes "0" and the AND gate 48 is prohibited, then the latching circuit 36 retains the values of the flip-flops 31 to 34 of the counter 35 at a time the A/D conversion is completed as it is. Therefore, the flip-flops 50 to 52 which memorizes digital values of one step and above of shutter time also retains the values of the flip-flops 32 to 34 of the counter at a time the A/D conversion is completed as it is. As has been explained above, the values of the flip-flops 32 to 34 show such digital values as precisely corresponding to a preset shutter time value when the step number in errors is in the positive direction, therefore, a shutter time will be accurately controlled according to a preset value when the step number in errors is within the range of $+\frac{1}{8}$ to $\frac{3}{8}$ steps.

Also when the step number in errors is within a range of $-\frac{1}{8}$ step to $-4/8$ steps, the Q3 output of the flip-flop 31 will be "1" as shown in FIG. 3. Therefore, the Q7 output of the flip-flop 49 of the latching circuit in this case also shows "1". Said "1" signal is impressed to one of input terminals of the AND gate 48, and at the same time the other input terminal of said gate 48 is connected to the $\overline{Q}$ output of the flip-flop 17. As has been explained above, the flip-flop 17 produces from the Q output a single pulse produced from the single pulse generating circuit 16 at a time the A/D conversion is completed with a delay by one clock pulse, therefore the $\overline{Q}$ output of the flip-flop 17 produces negative pulses with a delay by 1 clock pulse after a completion of A/D conversion. Therefore, the AND gate 48 transmits said negative pulse to the flip-flop 49 and makes the value of the latching circuit to be up by 1 pulse count. Thus, the values of the flip-flops 50 to 52 are shifted by one step. Therefore, the values of the flip-flops 50 to 52 will be set at such values as being one step advanced against the values of the flip-flops 32 to 34 of the counter at a time the A/D conversion is completed. Since the values of the counter 32 to 34 at the time A/D conversion is completed becomes to be one step delayed against the set shutter time in case the step number in error is in the negative direction as mentioned above, the values of the flip-flops 50 to 52 of the latching circuit will be corrected by the above-mentioned operation, thus a digital value precisely corresponding to a set shutter time is obtained. As has been explained above even if a step number in errors is within a range of $+\frac{3}{8}$ step to $-4/8$ step a shutter time will be controlled according to a preset value in this example, also.

Figure 9:
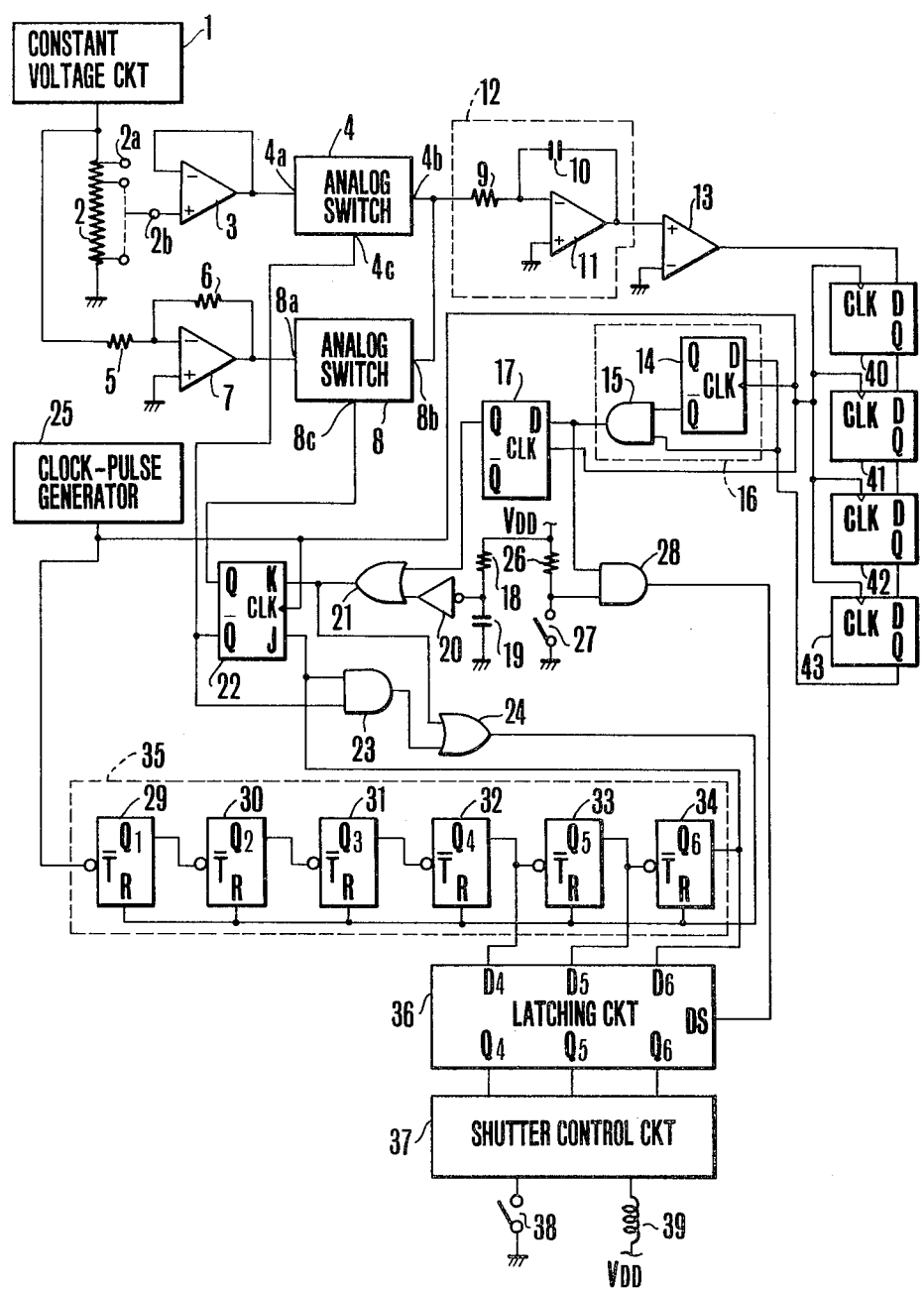
FIG. 9 is a circuit diagram to show still another example of the present invention.

FIG. 9 is a circuit diagram to show another example of the present invention. Same component elements in this example as in the example of FIG. 1 are identified with same marks and numbers. The circuit shown in FIG. 9 is different from the example shown in FIG. 1 in that a voltage set at the tap electrode 2a of the resistor 2 is so set as corresponding to one step of shutter time without making an addition by $+4/8$ step each as in FIG. 8, further the flip-flops 40 to 43 are connected to the output terminal of the comparator 13, and the value of the counter 35 is transmitted to the latching circuit 36 at a time being delayed by 4 clock pulses from a moment the A/D conversion is completed.

Explanations shall be made on operations of the example shown in FIG. 9. Since operations till a time a preset value at the resistor 2 is A/D converted are same as those in the example shown in FIG. 1, explanations thereof will be omitted. Now, it is supposed that an A/D conversion is completed and an output of the comparator 13 becomes to have a high level. Since a value of the counter 35 at this time shows such digital value as corresponding to the preset value and the preset value does not have an addition of $+4/8$ steps over the set value, if a number of steps in errors is in a range of $-\frac{1}{8}$ step to $-4/8$ step, a digital value representing one step or above of shutter time at this time will be such value as corresponding to a shutter time being delayed by one step from the set shutter time. For example, when 1/500 second is preset, the count values at the counter 35 will be as shown in FIG. 3, and if there are errors of $-\frac{1}{8}$ to $-4/8$ steps against the preset value, the Q outputs of the flip-flops 32 to 34 all become "0" to show a digital value representing 1/1000 second. Therefore, as the value of the counter is transmitted to the latching circuit and a shutter time control is made based on the digital value transmitted to the latching circuit, if a set analog voltage contains errors of $-\frac{1}{8}$ step to $-4/8$ step against the set shutter time, a shutter control will be made with 1/1000 second being one step delayed.

Therefore, in this example, the single pulse generation circuit 16 is actuated at a moment being delayed by 4 clock pulses by the flip-flops 40 to 43 from a moment the A/D conversion has completed that is a moment the comparator 13 produces a high level, and the count value at the counter 35 is transmitted to the latching circuit at a moment the counter makes a pulse counting of as much as 4 clock pulses from a completion of the A/D conversion, so that a shutter control according to a preset shutter time is carried out even under the above-mentioned case. By such arrangement, the count value having 4 pulses counted up over the value of the counter from a moment the A/D conversion has been completed will be transmitted to the latching circuit. Therefore, even when there are errors of $-\frac{1}{8}$ step to $-4/8$ step against a preset value of 1/500 second and the value of the counter is so set as shown in FIG. 3 at a time the A/D conversion is completed as mentioned above, a value with 4 pulses counted up over said value of counter, that is the value shown in FIG. 4 will be transferred to the latching circuit, thus a shutter time will be controlled according to a preset value even if there are errors of $+\frac{3}{8}$ step to $-4/8$ step.

As has been explained above in detail, in a shutter time control device according to the present invention, a voltage corresponding to a preset shutter time is formed and said voltage is A/D converted, then information representing intermediate shutter times out of said A/D converted digital values is cut off and at the same time a correction of a prescribed amount against said A/D converted values is made, therefore even when an accuracy of a voltage corresponding to a preset shutter time contains errors both in positive and negative directions, such digital values as accurately corresponding to a preset shutter time can be formed, thus an accurate shutter time control can be secured all the time.

What we claim:

1. A camera comprising a shutter time forming circuit for forming an analog signal representing a preset value of time, an A/D conversion circuit for converting said analog signal to an n-bit digital value, and a shutter time control circuit for controlling the shutter time in accordance with the most significant k-th bit to n-th bit of the said digital value, and further comprising:
   superimposing means for superimposing a prescribed digital value of less than k bits ranging from 1st to (k−1)th bit to said n-bit digital value.

2. A camera comprising:
   (a) a shutter presetting means for setting the shutter time in discrete incremental values of one step;
   (b) a shutter time forming circuit for forming an analog singal proportional to a shutter time value obtained by adding a prescribed shutter time value of less than one step to the one-step-incremental shutter time value set in said shutter presetting means;
   (c) an A/D conversion circuit responsive to said analog signal from said shutter time forming circuit for producing an n-bit digital value, said n-bit digital value being comprised of a most significant k-th bit to the n-th bit digital information representing the shutter time value of more than one step, and a digital information of less than k bits ranging from 1−(k−1) bits representing the shutter time value of less than one step; and (d) a shutter time control circuit for controlling the shutter time in accordance with that fraction of the digital value from said A/D conversion circuit which is of the most significant k-th bit to n-th bit.

3. A camera comprising:
(a) shutter presetting means for setting an incremental shutter time value of one step;
(b) a shutter time signal forming circuit for forming an analog signal the one-step incremental shutter time value set by said presetting means;
(c) a constant time forming circuit for forming an analog signal corresponding to a predetermined fraction of one step of the shutter time value;
(d) an adding circuit for adding the outputs of said shutter time forming circuit and said constant time forming circuit;
(e) an A/D conversion circuit for converting the output of said adding circuit to an n-bit digital value, said n-bit digital value being comprised of a digital value of the most significant k-th bit to n-th bit representing one of the steps of shutter time value and a digital value of less than k bits ranging from 1st to (k−1)th bit representing a fraction of the corresponding one step of shutter time value; and
(f) a shutter time control circuit for controlling the shutter time in accordance with that part of the digital value from said A/D conversion circuit which is of the most significant k-th to n-th bits.

4. A camera comprising:
(a) a shutter time value forming circuit for forming an analog signal corresponding to a preset value of time;
(b) an A/D conversion circuit for converting the analog signal from said forming circuit to an n-bit digital value; the n-bit digital value being comprised of a digital value of the most significant k-th to n-th bits respresenting one of the steps of shutter time values, and a digital value of less than k bits ranging from the 1st to (k−1)th bits representing a fraction of the corresponding one of the steps of shutter time values;
(c) adding means for adding predetermined digital value of less than k bits ranging from the 1st to the (k−1)th bits to said digital value; and
(d) a shutter time control circuit for controlling the shutter time in accordance with that part of said added digital value which is of the most significant k-th to the n-th bits.

5. A camera holding:
(a) a shutter time value forming circuit for forming an analog signal corresponding to a preset value of time;
(b) an A/D conversion circuit for converting the analog signal from said forming circuit to an n-bit digital value; the n-bit digital value being comprised of a digital value of the most significant k-th to n-th bits representing one of the steps of shutter times values, and a digital value of less than k bits ranging from 1st to (k−1)th bits representing a fraction of the corresponding one of the steps of shutter time values;

(c) a setting circuit for setting a prescribed digital value of less than k bits ranging from 1st to (k−1)th bit in said A/D conversion circuit, the output of said A/D conversion circuit representing a value obtained by adding the set value to the digital value corresponding to the preset time value; and
(d) a shutter time control circuit for controlling the shutter time in accordance with that part of the output of said A/D conversion circuit which is a digital value of the most significant k-th bit to the n-th bit.

6. A camera including:
(a) a shutter time value forming circuit for forming an analog signal corresponding to a preset value of time;
(b) an A/D conversion circuit for converting the analog signal from said forming circuit to an n-bit digital value; the n-bit digital value is being comprised of a digital value of the most significant k-th to n-th bits representing one of the steps of shutter time values, and another digital value of less than k bits ranging from the 1st to (k−1)th bits representing a fraction of the corresponding one of the steps of shutter time values;
(c) control means receptive of that part of said digital value which is of the (k−1) bits and responsive to detection of when a signal of said bits lies in a first signal condition for inverting the signal condition of the k-th bit, and responsive to detection of when the value of said (k−1) bits lies in a second signal condition for holding the signal condition of the k-th bit as it is; and
(d) a shutter time control circuit for controlling the shutter time in accordance with that part of said digital value which is of the most significant k-th to n-th bits.

7. A camera including:
(a) shutter presetting means for setting a shutter time;
(b) a shutter time signal forming circuit for forming an analog signal corresponding to a shutter time value obtained by adding a prescribed time value to the set value of shutter time;
(c) an A/D conversion circuit for converting the analog signal of said shutter time signal forming circuit to an n-bit digital value; and
(d) a shutter control circuit for controlling the shutter time in accordance with that part of said n-bit digital value which is of the most significant k-th to the n-th bits.

8. A camera including:
(a) a shutter time signal forming circuit for forming an analog signal corresponding to a preset time value;
(b) a constant shutter time signal forming circuit for forming an analog signal corresponding to a prescribed constant shutter time value;
(c) adding means for adding the outputs of said two signal forming circuits;
(d) an A/D conversion circuit for converting said added analog signal to an n-bit digital signal; and
(e) a shutter control circuit for controlling the shutter time in accordance with that part of said n-bit digital value which is of the most significant k-th to the n-th bits.

9. A camera including:
(a) a shutter time signal forming circuit for forming an anlog signal corresponding to a preset time value;

(b) a A/D conversion circuit for converting the analog signal of said signal forming circuit to an n-bit digital value, said circuit including a counter for performing the A-to-D conversion and counting the number of pulses corresponding to said analog signal;

(c) a supply circuit for supplying a prescribed number of additional pulses to said counter independently of said analog signal when said A-to-D conversion operates; and (d) a shutter control circuit for controlling the shutter time in accordance with that part of the output of said A/D conversion circuit which respresents a digital value of the most significant k-th to n-th bits.

10. A camera including:

(a) a shutter time signal forming circuit for forming an analog signal corresponding to a preset time value;

(b) an A/D conversion circuit for converting the analog signal of said shutter time signal forming circuit to an n-bit digital value;

(c) a constant time signal forming circuit for producing a prescribed constant shutter time value information; and (d) a shutter control circuit for controlling the shutter time in accordance with that part of said digital value corresponding to said preset time value which is of the most significant k-th to n-th bits, and said constant shutter time value information.

* * * * *